United States Patent
Wang et al.

(10) Patent No.: US 11,540,534 B2
(45) Date of Patent: Jan. 3, 2023

(54) PICKERING EMULSION PREPARED USING PEANUT PROTEIN ISOLATE AND PREPARATION METHOD THEREOF

(71) Applicant: INSTITUTE OF FOOD SCIENCE AND TECHNOLOGY, CHINESE ACADEMY OF AGRICULTURAL SCIENCES, Beijing (CN)

(72) Inventors: Qiang Wang, Beijing (CN); Aimin Shi, Beijing (CN); Bo Jiao, Beijing (CN); Hongzhi Liu, Beijing (CN); Li Liu, Beijing (CN); Hui Hu, Beijing (CN)

(73) Assignee: INSTITUTE OF FOOD SCIENCE AND TECHNOLOGY, CHINESE ACADEMY OF AGRICULTURAL SCIENCES, Beijing (CN)

( * ) Notice: Subject to any disclaimer, the term of this patent is extended or adjusted under 35 U.S.C. 154(b) by 138 days.

(21) Appl. No.: 16/473,140

(22) PCT Filed: Jul. 23, 2018

(86) PCT No.: PCT/CN2018/096580
§ 371 (c)(1),
(2) Date: Jun. 24, 2019

(87) PCT Pub. No.: WO2019/037563
PCT Pub. Date: Feb. 28, 2019

(65) Prior Publication Data
US 2020/0170279 A1    Jun. 4, 2020

(30) Foreign Application Priority Data
Aug. 21, 2017  (CN) .......................... 201710720028.6

(51) Int. Cl.
*A23J 3/14*    (2006.01)
*A23L 29/269*  (2016.01)
(Continued)

(52) U.S. Cl.
CPC . *A23J 3/14* (2013.01); *A23J 1/14* (2013.01); *A23L 29/10* (2016.08); *A23L 29/238* (2016.08); *A23L 29/27* (2016.08); *A23L 29/275* (2016.08)

(58) Field of Classification Search
CPC ........ A23L 29/20; A23L 29/26; A23L 29/212; A23L 29/219; A23L 29/225;
(Continued)

(56) References Cited

FOREIGN PATENT DOCUMENTS

CN    102696859 A  * 10/2012
CN    102936490 A  *  2/2013
(Continued)

OTHER PUBLICATIONS

Jani, "Peanut Protein: Rich Source as Vegan Protein", Journal of Food Science and Nutrition, published date Mar. 25, 2020 (Year: 2020).*

*Primary Examiner* — Changqing Li
(74) *Attorney, Agent, or Firm* — IP & T Group LLP

(57) ABSTRACT

A method for preparing a Pickering emulsion using a peanut protein isolate includes preparing a peanut protein isolate dispersion liquid from a peanut protein isolate solution as a raw material; preparing a mixed dispersion of protein and polysaccharide using a polysaccharide solution and the peanut protein isolate dispersion; adding transglutaminase to the mixed dispersion of protein and polysaccharide, preparing a monolithic gel by cross-linking reaction; preparing a microgel particle dispersion by using the monolithic gel as a raw material; and further adding the microgel particle dispersion to an edible oil to obtain a Pickering emulsion. During the preparation process, no inorganic material is added, and the obtained Pickering emulsion has good biosafety and strong biocompatibility. The prepared Pickering emulsion can keep stable at room temperature for 30 days or
(Continued)

more, and can be used as a delivery system for fat-soluble and photosensitive active substances.

14 Claims, 1 Drawing Sheet

(51) Int. Cl.
*A23L 29/275* (2016.01)
*A23L 29/238* (2016.01)
*A23J 1/14* (2006.01)
*A23L 29/10* (2016.01)

(58) Field of Classification Search
CPC .... A23L 29/231; A23L 29/238; A23L 29/244; A23L 29/25; A23L 29/256; A23L 29/262; A23L 29/269; A23L 29/27; A23L 29/271; A23L 29/272; A23L 29/273; A23L 29/274; A23L 29/10; A23J 3/14; A23J 3/16; A23J 3/18; A23J 1/12; A23J 1/14; A23J 1/125; A23J 1/005; A23J 1/006; A23J 1/007

See application file for complete search history.

(56) References Cited

FOREIGN PATENT DOCUMENTS

| | | | |
|---|---|---|---|
| CN | 104031276 | | 9/2014 |
| CN | 105853358 A | * | 8/2016 |
| CN | 105994698 | | 10/2016 |
| CN | 105994698 A | * | 10/2016 |
| CN | 106174438 | | 12/2016 |
| CN | 106174438 A | * | 12/2016 |
| CN | 107455550 | | 12/2017 |

\* cited by examiner

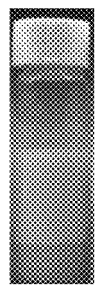

PICKERING EMULSION PREPARED USING PEANUT PROTEIN ISOLATE AND PREPARATION METHOD THEREOF

This application is a national stage application of PCT/CN2018/096580 filed on Jul. 23, 2018, which claims the priority of Chinese Patent Application No. 201710720028.6, filed on Aug. 21, 2017. The disclosure of each of the foregoing applications is incorporated herein in its entirety by reference.

TECHNICAL FIELD

The present invention relates to a method for preparing a Pickering emulsion using peanut protein isolate, and belongs to the technical field of food processing.

BACKGROUND ART

Emulsions play a critical role in the food industry, for example, protein drinks, ice cream, mayonnaise and the like are common emulsion systems in food consumption. Emulsion not only exhibits unique sensory qualities, but also has important value in nutrient delivery. However, in recent years, the safety of low-molecular-weight surfactants (LWSFs) in traditional emulsifiers has caused consumers' concern, and food emulsions without LWSFs will be more suitable for the actual needs of consumers.

Pickering emulsion is a kind of emulsion which is stabilized by solid particles, rather than traditional emulsifiers. Compared with a traditional emulsion which is stabilized by low-molecular-weight surfactants and natural macromolecules, the adsorption process of solid particles on the water-oil interface, which play the function of emulsification in a Pickering emulsion, is irreversible, and the particles not only reduce the total free energy of the system, but also provide a spatial physical barrier for the contact between the droplets, which gives the Pickering emulsion a stronger stability.

However, at present, the particles capable of stabilizing the Pickering emulsion are mostly inorganic material particles such as $SiO_2$ and $TiO_2$. When applied to the food field, they have many problems such as low bioavailability and poor biodegradability, and thus there is an immediate need to develop food-grade Pickering emulsion.

Peanut protein is rich in nutrient value and contains 8 kinds of essential amino acids. Wherein, the content of lysine is 3 to 8 times higher than that of rice, wheat and corn, and the effective utilization rate of lysine is up to 98.94%, while the effective utilization rate of lysine in soybean is only 78%. In addition, arginine and glutamic acid are high in content. The peanut protein has functions of brain strengthening and memory enhancement. The contents of indigestible sugar, raffinose and stachyose in peanut protein is equivalent to 1/7 of soy protein, and thus the peanut protein does not cause bloating, and has a biological value much higher than that of soybean. In addition, peanut protein has strong functional properties, good emulsifying properties and good gelling properties, and it can be used in meat products and cereal baked food to improve the texture and structure of the products. Peanut protein is a high quality raw material for the development of food-grade Pickering emulsions, in both terms of nutritional enhancement and functional quality.

However, so far there is no ideal method for preparing a Pickering emulsion using peanut protein isolate.

SUMMARY OF THE INVENTION

A first purpose of the present invention is to provide a method for preparing a Pickering emulsion using peanut protein isolate which can stabilize the Pickering emulsion at a relatively low particle concentration.

Specifically, the method for preparing a Pickering emulsion using peanut protein isolate according to the present invention comprises the following steps:

(1) preparing a peanut protein isolate solution having a mass concentration of 4% to 30%, stirring, and refrigerating the solution to fully hydrate the protein to obtain a peanut protein isolate dispersion;

(2) preparing a polysaccharide solution having a mass concentration of 0.04% to 0.2%, stirring and mixing the polysaccharide solution with the peanut protein isolate dispersion at a mixing ratio by mass of protein to polysaccharide of 10:1 to 180:1, stirring, and shearing the resultant at a high speed to obtain a mixed dispersion of protein and polysaccharide;

(3) adjusting the pH of the peanut protein isolate dispersion obtained in the step (1) or the mixed dispersion of protein and polysaccharide obtained in the step (2) to 6.1 to 8.2, heating the resultant in a water bath at 70 to 95° C. for 10 to 45 minutes, cooling to room temperature, then adding transglutaminase (TG) in an amount of 6 to 35 U/g of peanut protein isolate, carrying out cross-linking reaction in a water bath at 37 to 49° C., and heating the resultant at 75 to 100° C. for 10 to 30 minutes after the reaction is completed, to obtain a monolithic gel;

(4) adding water in an amount that is 1 to 3 times as much as the mass of the monolithic gel to the monolithic gel, shearing the resultant using a high-speed disperser at a high speed of 8,500 rpm to 13,500 rpm for 30 seconds to 120 seconds to obtain a coarse dispersion of microgel particles, and then homogenizing the coarse dispersion using a high-pressure homogenizer at a high pressure of 600 to 1,200 bar for 2 to 5 minutes to obtain a microgel particle dispersion; and (5) adding the microgel particle dispersion to an edible oil at such an amount that the particle concentration is 0.1 to 2% based on the concentration of the peanut protein isolate, and/or that the oil phase mass fraction is 10% to 90%; and shearing the resultant at a high speed of 8,000 to 13,500 rpm for 45 to 180 seconds to give the Pickering emulsion.

The peanut protein isolate of the present invention is prepared from commercially available peanut protein powder (for example, available from Qingdao Changshou Food Co., Ltd.) by alkaline dissolution and acid precipitation, and the specific preparation method is known to a person skilled in the art. The method of the present invention controls the protein content of the prepared peanut protein isolate to be 85% to 92% (calculated with a protein conversion coefficient of 5.46).

When used, the peanut protein isolate is further formulated into a peanut protein isolate solution having a mass concentration of 4% to 30%, preferably a mass concentration of 6% to 27%, more preferably 10% to 15%, using water as a solvent, and the peanut protein isolate solution with a concentration falling within the above concentration range facilitates the cross-linking reaction of transglutaminase.

In the step (1), the prepared peanut protein isolate solution may be sufficiently stirred and then refrigerated at 1 to 10° C. for 12 to 16 hours to fully hydrate the protein, wherein the ideal stirring condition is stirring at 150 to 250 rpm for 1 to 4 hours.

As a preferred embodiment of the present invention, a polysaccharide solution may be further added to the peanut protein isolate dispersion to adjust the three phase contact angles of the particles to a more suitable angle so as to achieve stabilization of the final Pickering emulsion.

Wherein the polysaccharide may be one of chitosan, guar gum, xanthan gum, glucan, and arabic gum, and preferably the added polysaccharide is chitosan, guar gum or xanthan gum.

Wherein a further suitable concentration of the polysaccharide solution is 0.05% to 0.18%, more preferably 0.1% to 0.15%.

When the preparation method of the present invention requires further addition of a polysaccharide solution to the peanut protein isolate dispersion, a suitable addition amount is such that a mass ratio of protein to polysaccharide is 10:1 to 180:1, preferably 100:1 to 170:1, more preferably 120:1 to 160:1, which is beneficial to the binding between protein and polysaccharide through interaction.

After mixing the polysaccharide solution and the peanut protein isolate dispersion, it is preferably further stirring and shearing the dispersion using a high-speed disperser at a speed of 6,000 to 10,000 rpm for 1 to 3 minutes to control the degree of dispersing uniformity of the protein and polysaccharide, so as to prepare an ideal mixed dispersion of protein and polysaccharide.

In the method of the present invention, in step (3), the pH of the peanut protein isolate dispersion obtained in the step (1) or the mixed dispersion of protein and polysaccharide obtained in the step (2) is preferably adjusted to 6.3 to 7.9, preferably 6.9 to 7.2, which pH range is beneficial to achievement of the cross-linking reaction in the presence of transglutaminase.

In the method of the present invention, a transglutaminase is added to the mixed dispersion of protein and polysaccharide to realize cross-linking reaction and prepare a monolithic gel; wherein the ideal amount of transglutaminase is 7 to 30 U/g of peanut protein isolate, preferably 15 to 30 U/g of peanut protein isolate. The transglutaminase of the present invention is a known enzyme and can be commercially available from Beijing Suobao Technology Co., Ltd.

According to the method of the present invention, the microgel particle dispersion prepared in the step (4) has a hydrodynamic diameter of 100 to 400 nm, and the microgel particle dispersion has the advantages of stable system and small particle size, and is suitable for replacing the traditional emulsifier to achieve adsorption on the oil-water interface, thereby stabilizing the system in the manner of a Pickering emulsion.

In the preparation method of the present invention, the edible oil in the step (5) may be one or more selected from soybean oil, rapeseed oil, sunflower oil, and peanut oil (high temperature pressed or low temperature pressed), preferably may be soybean oil and peanut oil (low temperature pressed), so as to prepare a more ideal Pickering emulsion.

Wherein the microgel particle dispersion is added to the edible oil at such an amount that the particle concentration is 0.1 to 2%, and/or that the oil phase mass fraction is 10% to 90% (preferably the particle concentration is 0.1 to 2% and at the same time the oil phase mass fraction is 10% to 90%), and a more ideal addition amount is such that the particle concentration is 1% to 2%, which concentration is more beneficial to high-density coverage by the particles on the oil-water interface, thereby ensuring the stability of the final product.

According to a more ideal technical solution of the present invention, the method includes the following steps:

(1) preparing a peanut protein isolate solution having a mass concentration of 6% to 27%, fully stirring, refrigerating the solution at 1 to 10° C. for 12 to 16 hours to fully hydrate the protein so as to obtain a peanut protein isolate dispersion;

(2) preparing a polysaccharide solution having a mass concentration of 0.05 to 0.18%, stirring, mixing the polysaccharide solution with the peanut protein isolate dispersion at a mixing ratio by mass of protein to polysaccharide of 100:1 to 170:1, stirring, and shearing the dispersion using a high-speed disperser at a high speed of 6,000 to 10,000 rpm for 1 to 3 minutes to obtain a mixed dispersion of protein and polysaccharide;

(3) adjusting the pH of the peanut protein isolate dispersion obtained in the step (1) or the mixed dispersion of protein and polysaccharide obtained in the step (2) to 6.3 to 7.9, and heating the resultant in a water bath at 70 to 95° C. for 10 to 45 minutes, cooling to room temperature, adding transglutaminase in an amount of 7 to 30 U/g of peanut protein isolate, carrying out cross-linking reaction in a water bath at 37 to 49° C., and heating the resultant at 75 to 100° C. for 10 to 30 minutes after the reaction is completed, to obtain a monolithic gel;

(4) adding water in an amount that is 1 to 3 times as much as the mass of the monolithic gel to the monolithic gel, and shearing the resultant using a high-speed disperser at a high speed of 8,500 rpm to 13,500 rpm for 30 seconds to 120 seconds to obtain a microgel particle coarse dispersion, and then homogenizing the coarse dispersion using a high-pressure homogenizer at a high pressure of 600 to 1,200 bar for 2 to 5 minutes to obtain a microgel particle dispersion; and (5) adding the microgel particle dispersion liquid to an edible oil at such an amount that the particle concentration is 1 to 2% based on the concentration of the peanut protein isolate, and/or that the oil phase mass fraction is 10% to 90%; and shearing the resultant at a high speed of 8,000 to 13,500 rpm for 45 to 180 seconds to give the Pickering emulsion.

The present invention simultaneously claims a Pickering emulsion prepared in accordance with the above-described preparation method of the present invention.

The Pickering emulsion prepared by the present invention has a particle diameter of 20 μm to 70 μm and can keep stable at room temperature for one month or more, and is desirable as a delivery system for fat-soluble and photosensitive active materials.

The invention is characterized in that, (1) A Pickering emulsion can be prepared using peanut protein isolate as a raw material without adding any inorganic materials, which greatly broadens the application of the Pickering emulsion in food industry;

(2) Gel particles can be prepared by cross-linking in the presence of TG, which is low in cost and simple in operation;

(3) The obtained Pickering emulsion has strong stability and can keep stable at room temperature for 1 month or more (the shelf life can be up to 1 year). Compared with other known Pickering emulsions, the obtained Pickering emulsion has the advantages such as strong biosafety, high stability, and simple preparation.

BRIEF DESCRIPTION OF THE DRAWINGS

FIG. 1 is a photograph showing the appearance of the Pickering emulsion prepared in Example 1.

SPECIFIC MODES FOR CARRYING OUT THE EMBODIMENTS

The present invention will be further described below in combination with the examples, but the technical solutions of the present invention are not limited to the examples listed below.

Example 1

The present Example provides a method for preparing a Pickering emulsion using peanut protein isolate, and the specific steps were as follows:

a). 6% peanut protein isolate solution was prepared, stirred for 2 hours, then refrigerated in a refrigerator at 4° C. overnight, such that the protein was fully hydrated to obtain a peanut protein isolate dispersion;

b). the pH of the peanut protein isolate dispersion was adjusted to 6.3, and the peanut protein isolate dispersion was heated in a water bath at 70° C. for 14 minutes, cooled to room temperature, and added with transglutaminase (7 U/g of peanut protein isolate); and cross-linking reaction was performed in a water bath at 37° C. for 1 hour; after the reaction was completed, the resultant was heated at 85° C. for 10 minutes to obtain a monolithic gel;

c). the monolithic gel obtained in b) was added with water in an amount that was 2 times as much as the mass of the monolithic gel, and sheared using a high-speed disperser at a high speed of 8,500 rpm for 35 seconds to obtain a microgel particle coarse dispersion, and then the coarse dispersion was subjected to high-pressure homogenization using a high pressure homogenizer under a pressure of 750 bar for 2 minutes to obtain a microgel particle dispersion, and the properties of the particles were shown in Table 1.

d). the dispersion obtained in step c) was added to peanut oil such that the particle concentration (calculated based on the peanut protein isolate) was 0.5%, and the oil phase mass fraction was 50%; and the resultant was sheared at a high speed of 8,500 rpm for 60 seconds to give the Pickering emulsion stabilized by the peanut protein.

The appearance of the Pickering emulsion prepared in the Example was shown in FIG. 1. The particle size of the emulsion was 43±2.5 μm. The creaming index during storage was shown in Table 2. The results show that the creaming index was not changed significantly during 30 days of storage, and the emulsified layer of the emulsion was stable.

Example 2

The present Example provides a method for preparing a Pickering emulsion using peanut protein isolate, and the specific steps were as follows:

a). 11% peanut protein isolate solution was prepared, stirred for 2 hours, then refrigerated in a refrigerator at 4° C. overnight, such that the protein was fully hydrated to obtain a peanut protein isolate dispersion;

b). 0.05% chitosan solution was prepared, stirred for 2 hours, and then mixed with the peanut protein isolate dispersion obtained in a), such that the ratio of protein to polysaccharide in the final solution was 100:1, the obtained dispersion was stirred for another 30 minutes, and sheared using a high-speed disperser at a high speed of 11,500 rpm for 1 minute to obtain a mixed dispersion of protein and polysaccharide;

c). the pH of the mixed dispersion was adjusted to 7.2, and then the dispersion was heated in a water bath at 83° C. for 39 minutes, cooled to room temperature, and added with transglutaminase (15 U/g of peanut protein isolate), and cross-linking reaction was performed in a water bath at 42° C. for 3 hours, after the reaction was completed, the resultant was heated at 80° C. for 17 minutes to obtain a monolithic gel;

d). the monolithic gel obtained in c) was added with water in an amount that was 2 times as much as the mass of the monolithic gel, and sheared using a high-speed disperser at a high speed of 11,000 rpm for 80 seconds to obtain a microgel particle coarse dispersion, and then the coarse dispersion was subjected to high-pressure homogenization using a high pressure homogenizer under a pressure of 1,100 bar for 4 minutes to obtain a microgel particle dispersion, and the properties of the particles were shown in Table 3; and e). the dispersion obtained in d) was added to edible soybean oil such that the particle concentration (calculated based on the concentration of peanut protein isolate) was 1.3%, and the oil phase mass fraction was 60%; the resultant was sheared at a high speed of 7,500 rpm for 70 seconds to give the Pickering emulsion stabilized by the peanut protein isolate. The particle size of the emulsion was 53.85±1.63 μm. The emulsion can keep stable for 1 month or more at room temperature. The creaming index during storage was shown in Table 4. The results show that the creaming index was not changed significantly during 30 days of storage, and the emulsified layer of the emulsion was stable.

TABLE 1

Analysis on properties of the microgel particle dispersion

| Sample name | Zeta potential | Particle size (nm) |
|---|---|---|
| microgel particle dispersion of peanut protein isolate | −37.84 ± 0.48 | 187.65 ± 1.37 |

TABLE 2

Creaming index of the Pickering emulsion

| | Storage days | | |
|---|---|---|---|
| Sample name | 1 | 10 | 30 |
| Pickering emulsion | 27.84 ± 3.59 | 30.42 ± 1.01 | 30.11 ± 1.32 |

TABLE 3

Analysis on properties of the microgel particle dispersion

| Sample name | Zeta potential | Particle size (nm) |
|---|---|---|
| microgel particle dispersion of peanut protein isolate-chitosan | −36.63 ± 0.51 | 174.57 ± 1.19 |

TABLE 4

Creaming index of the Pickering emulsion

| | Storage days | | |
|---|---|---|---|
| Sample name | 1 | 10 | 30 |
| Pickering emulsion | 27.92 ± 0.65 | 29.67 ± 1.10 | 31.58 ± 0.24 |

Example 3

The present Example provides a method for preparing a Pickering emulsion using peanut protein isolate, and the specific steps were as follows:

a). 27% peanut protein isolate solution was prepared, stirred for 2 hours, then refrigerated in a refrigerator at 4° C. overnight, such that the protein was fully hydrated to obtain a peanut protein isolate dispersion;

b). 0.18% guar gum solution was prepared, stirred for 2 hours, and then mixed with the peanut protein isolate dispersion obtained in a), such that the ratio of protein to polysaccharide in the final solution was 170:1, the resultant was stirred for another 30 minutes, and sheared using a high-speed disperser at a high speed of 11,500 rpm for 1 minute to obtain a mixed dispersion of protein and polysaccharide;

c). the pH of the mixed dispersion was adjusted to 7.9, and the dispersion was heated in a water bath at 90° C. for 40 minutes, cooled to room temperature, and added with transglutaminase (30 U/g of peanut protein isolate), and crosslinking reaction was performed in a water bath at 48° C. for 4 hours; after the reaction was completed, the resultant was heated at 95° C. for 30 minutes to obtain a monolithic gel;

d). the monolithic gel obtained in c) was added with water in an amount that was 2 times as much as the mass of the monolithic gel, and sheared using a high-speed disperser at a high speed of 13.500 rpm for 115 seconds to obtain a microgel particle coarse dispersion, and then the coarse dispersion was subjected to high-pressure homogenization using a high pressure homogenizer under a pressure of 1,200 bar for 5 minutes to obtain a microgel particle dispersion, and the properties of the particles were shown in Table 5, and e). the dispersion obtained in d) was added to peanut oil such that the particle concentration (calculated based on the concentration of peanut protein isolate) was 1.8%, and the oil phase mass fraction was 70%; the resultant was sheared at a high speed of 7,500 rpm for 180 seconds to give the Pickering emulsion stabilized by the peanut protein isolate. The particle size of the emulsion was 37.84±0.71 μm. The emulsion can keep stable for 1 month or more at room temperature. The creaming index during storage was shown in Table 6. The results show that the creaming index was not changed significantly during 30 days of storage, and the emulsified layer of the emulsion was stable.

TABLE 5

Analysis on properties of microgel particle dispersion

| Sample name | Zeta potential | Particle size (nm) |
|---|---|---|
| microgel particle dispersion of peanut protein isolate-guar gum | −35.73 ± 0.97 | 198.6 ± 3.04 |

TABLE 6

Creaming index of the Pickering emulsion

| | Storage days | | |
|---|---|---|---|
| Sample name | 1 | 10 | 30 |
| Pickering emulsion | 29.41 ± 0.00 | 29.86 ± 0.45 | 31.06 ± 0.76 |

Comparative Example 1

Example 1 of Chinese application No. 201310686408.4 discloses a preparation method of a silicone oil Pickering emulsion, in which silica inorganic particles and a surfactant are used to achieve the stability of the emulsion. The stabilizer has low biodegradability and certain biological toxicity, which limit the application of the Pickering emulsion in the field of biomedicine. However, the present invention uses natural materials such as peanut protein and polysaccharide, does not have the problems such as biodegradability and biological toxicity, and broadens the application range of Pickering emulsion while ensuring the stability.

Comparative Example 2

Example 1 of Chinese application No. 201610375510.6 discloses a preparation method of a Pickering emulsion stabilized by an edible protein, which needs to introduce an organic solvent ethanol in the preparation process. However, the present invention does not introduce any organic solvent in the preparation process, and will not cause any risk due to solvent residue, and can prepare a high-quality Pickering emulsions.

The above description are only preferred embodiments of the present invention, and it should be noted that, a person skilled in the art can make some improvements and modifications, such as changing the amount of materials, and changing the temperature and time during processing, without departing from the technical principles of the present invention, and these improvements and modifications should also be regarded as being within the protection scope of the present invention.

INDUSTRIAL APPLICABILITY

The present invention provides a method for preparing a Pickering emulsion using a peanut protein isolate, which comprises preparing a peanut protein isolate dispersion using a peanut protein isolate solution as raw material; preparing a mixed dispersion of protein and polysaccharide by using a polysaccharide solution and the peanut protein isolate dispersion; adding transglutaminase to the mixed dispersion of protein and polysaccharide, preparing a monolithic gel by cross-linking reaction; preparing a microgel particle dispersion using the monolithic gel as a raw material; and further adding the microgel particle dispersion to an edible oil to prepare a Pickering emulsion. The present invention uses common equipment such as high-speed shearing machines and high-pressure homogenizer to perform granulation, and prepares Pickering emulsions by high-speed shearing. No inorganic material is added during the preparation process, and the obtained emulsion has good biosafety and strong biocompatibility. The prepared Pickering solution can keep stable at room temperature for 30 days or more, can be used as a delivery system for fat-soluble and photosensitive active substances, and has a broad application prospect.

What is claimed is:

1. A method for preparing a Pickering emulsion using a peanut protein isolate, the method comprising performing the following operations in the recited order:

(1) preparing a peanut protein isolate solution having a mass concentration of 6% to 27%, stirring, and refrigerating the solution to fully hydrate the protein to obtain a peanut protein isolate dispersion;

(2) adjusting the pH of the peanut protein isolate dispersion obtained in the step (1) to 6.1 to 8.2, heating the pH-adjusted peanut protein isolate dispersion in a water bath at a temperature of 70 to 95° C. for 10 to 45 minutes, cooling the heated peanut protein isolate dispersion to room temperature;

(3) preparing a polysaccharide solution having a mass concentration of 0.04% to 0.2%, stirring and mixing the polysaccharide solution with the cooled peanut protein isolate dispersion at a mixing ratio by mass of protein to polysaccharide of 10:1 to 180:1, stirring, and shearing the mixture of peanut protein isolate dispersion and polysaccharide solution to obtain a mixed dispersion of the peanut protein isolate and the polysaccharide, adding transglutaminase in an amount of 6 to 35 U/g of peanut protein isolate to the mixed dispersion of peanut protein isolate and polysaccharide to carry out a cross-linking reaction in a water bath at a temperature of 37 to 49° C., and heating the resultant crosslinked reaction mixture at a temperature of 75 to 100° C. for 10 to 30 minutes after the reaction is completed, to obtain a monolithic gel;

(4) adding water in an amount that is 1 to 3 times as much as the mass of the monolithic gel to the monolithic gel to form a monolithic gel-water mixture, shearing the monolithic gel-water mixture by using a high-speed disperser at a high speed of 8,500 rpm to 13,500 rpm for 30 seconds to 120 seconds to obtain a microgel particle coarse dispersion, and then homogenizing the microgel particle coarse dispersion by using a high-pressure homogenizer under a high pressure of 600 to 1,200 bar for 2 to 5 minutes to obtain a microgel particle dispersion; and (5) adding the microgel particle dispersion to an edible oil at such an amount that the particle concentration is 0.1 to 2 wt % based on the concentration of the peanut protein isolate, and/or that the oil phase mass fraction is 10% to 90% to form a mixture of edible oil and microgel particle dispersion; and shearing the mixture of the edible oil and the microgel particle dispersion at a high speed of 8,000 to 13,500 rpm for 45 to 180 seconds to give the Pickering emulsion.

2. The method according to claim 1, characterized in that the protein content of the peanut protein isolate in the peanut protein isolate solution is 85 to 92 wt % protein.

3. The method according to claim 1, characterized in that, in the step (1), the prepared peanut protein isolate solution is stirred and then refrigerated at a temperature of 1 to 10° C. for 12 to 16 hours to fully hydrate the protein.

4. The method according to claim 1, characterized in that the polysaccharide is one selected from the group consisting of chitosan, guar gum, xanthan gum, glucan, and arabic gum and wherein the polysaccharide solution has a mass concentration of 0.05% to 0.18%.

5. The method according to claim 1, characterized in that, in the step (3), the mass ratio of protein to polysaccharide is 100:1 to 170:1.

6. The method according to claim 1, characterized in that, in step (2), the pH of the peanut protein isolate dispersion obtained in the step (1) is adjusted to 6.3 to 7.9, and in step (3) the transglutaminase is added in an amount of 7 to 30 U/g of peanut protein isolate.

7. The method according to claim 1, characterized in that the edible oil is one or more selected from soybean oil, rapeseed oil, sunflower oil, and peanut oil.

8. The method according to claim 1, characterized in that, the pH of the mixed dispersion of peanut protein isolate and polysaccharide obtained in the step (3) is adjusted to 6.3 to 7.9.

9. A method for preparing a Pickering emulsion, the method comprising:

(1) preparing a peanut protein isolate solution having a mass concentration of 6% to 27%, stirring, and refrigerating the solution at 1 to 10° C. for 12 to 16 hours to fully hydrate the protein to obtain a peanut protein isolate dispersion;

(2) preparing a polysaccharide solution having a mass concentration of 0.05 to 0.18%, stirring, mixing the polysaccharide solution with the peanut protein isolate dispersion at a mixing ratio by mass of protein to polysaccharide of 100:1 to 170:1, stirring, and shearing the resultant mixture of the peanut protein isolate dispersion and the polysaccharide solution by using a high-speed disperser at a high speed of 6,000 to 10,000 rpm for 1 to 3 minutes to obtain a mixed dispersion of the peanut protein isolate and the polysaccharide;

(3) adjusting the pH of the mixed dispersion of the peanut protein isolate and the polysaccharide obtained in the step (2) to 6.3 to 7.9, heating the pH-adjusted mixed dispersion of the peanut protein isolate and the polysaccharide in a water bath at a temperature of 70 to 95° C. for 10 to 45 minutes, cooling the heated pH-adjusted mixed dispersion of the peanut protein isolate and the polysaccharide to room temperature, adding a transglutaminase in an amount of 7 to 30 U/g of peanut protein isolate in the cooled pH-adjusted mixed dispersion of the peanut protein isolate and the polysaccharide to carry out a cross-linking reaction in a water bath at a temperature of 37 to 49° C., and heating the resultant crosslinked reaction mixture at a temperature of 75 to 100° C. for 10 to 30 minutes after the reaction is completed, to obtain a monolithic gel;

(4) adding water in an amount that is 1 to 3 times as much as the mass of the monolithic gel to the monolithic gel to form a monolithic gel-water mixture, shearing the monolithic gel-water mixture by using a high-speed disperser at a high speed of 8,500 rpm to 13,500 rpm for 30 seconds to 120 seconds to obtain a microgel particle coarse dispersion, and then homogenizing the microgel particle coarse dispersion by using a high-pressure homogenizer at a high pressure of 600 to 1,200 bar for 2 to 5 minutes to obtain a microgel particle dispersion; and (5) adding the microgel particle dispersion to an edible oil at such an amount that the particle concentration is 1 to 2 wt % based on the concentration of the peanut protein isolate, and/or that the oil phase mass fraction is 10% to 90%; and shearing the mixture of the edible oil and the microgel particle dispersion at a high speed of 8,000 to 13,500 rpm for 45 to 180 seconds to give the Pickering emulsion.

10. A Pickering emulsion prepared by the method according to claim 1.

11. The method according to claim 1, characterized in that the polysaccharide is one selected from the group consisting of chitosan, guar gum, and xanthan gum, and wherein the polysaccharide solution has a mass concentration of 0.1% to 0.15%.

12. The method according to claim 1, characterized in that, in the step (3), the mass ratio of protein to polysaccharide is 120:1 to 160:1.

13. The method according to claim 1, characterized in that, in step (2), the pH of the peanut protein isolate dispersion obtained in the step (1) is adjusted to 6.9 to 7.2, and in step (3) the transglutaminase is added in an amount of 15 to 30 U/g of peanut protein isolate.

14. The method according to claim 1, characterized in that the edible oil is one or more selected from soybean oil, and low temperature pressed peanut oil.

\* \* \* \* \*